United States Patent [19]

Niedermeyer

[11] 4,239,034
[45] Dec. 16, 1980

[54] SOLAR ENERGY COLLECTOR

[76] Inventor: William P. Niedermeyer, 1024 Mt. Mary Dr., Green Bay, Wis. 54301

[21] Appl. No.: 925,777

[22] Filed: Jul. 18, 1978

[51] Int. Cl.³ .............................................. F24J 3/02
[52] U.S. Cl. ................................... 126/439; 126/447; 126/448
[58] Field of Search ............... 126/438, 446, 439, 447, 126/448, 449

[56] References Cited

U.S. PATENT DOCUMENTS

| | | | |
|---|---|---|---|
| 3,321,012 | 5/1967 | Hervey | 126/438 |
| 4,003,364 | 1/1977 | Balkus, Jr. | 126/448 |
| 4,007,729 | 2/1977 | Chao et al. | 126/446 |
| 4,120,287 | 10/1978 | Marles et al. | 126/447 |

Primary Examiner—Carroll B. Dority, Jr.
Assistant Examiner—Lee E. Barrett
Attorney, Agent, or Firm—Francis J. Bouda

[57] ABSTRACT

A solar energy concentrating collector having at least one reflector surface and at least one substantially planar vertical absorbing means coacting therewith for the purpose of absorbing reflected solar rays, said absorber being at least partially located in a plane coincident with the nadir of the reflector surface, the absorber surfaces being continuous and at least portions of one fluid conduit, and at least one horizontal extension of said continuous absorber surface being below said coacting reflector surface.

18 Claims, 18 Drawing Figures

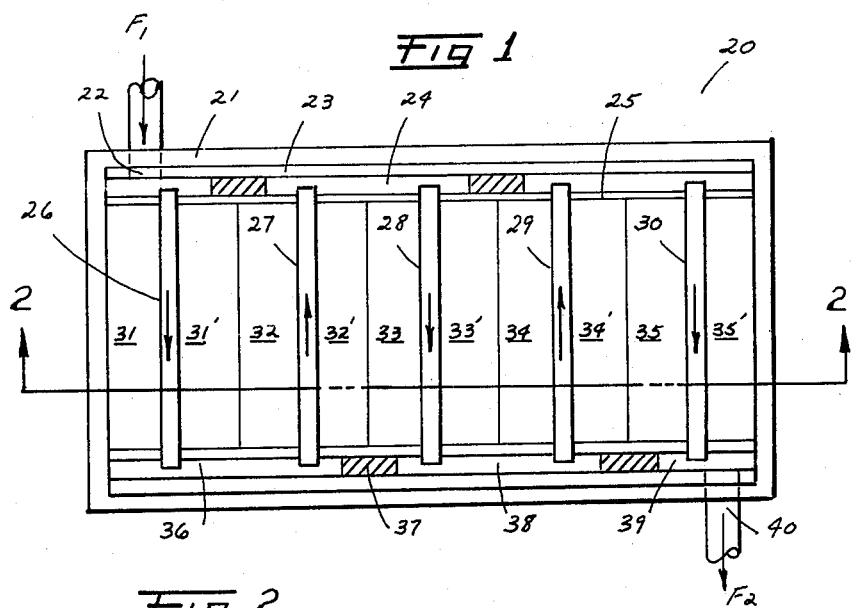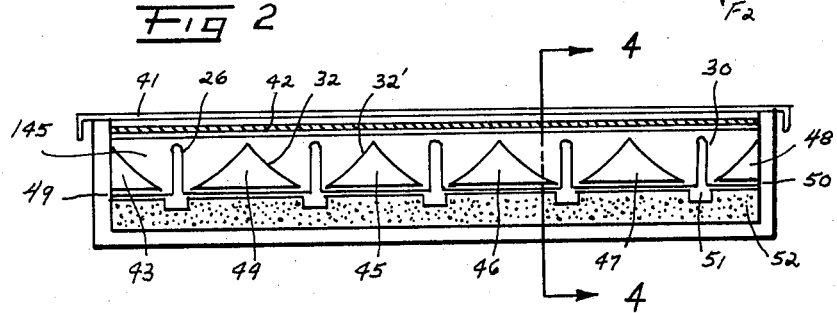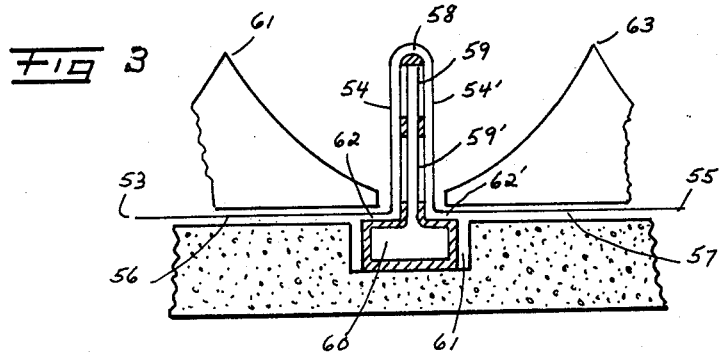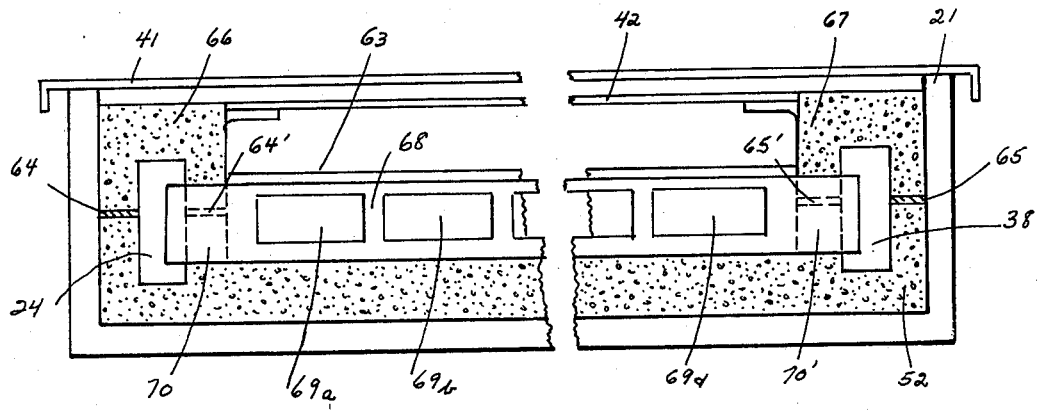

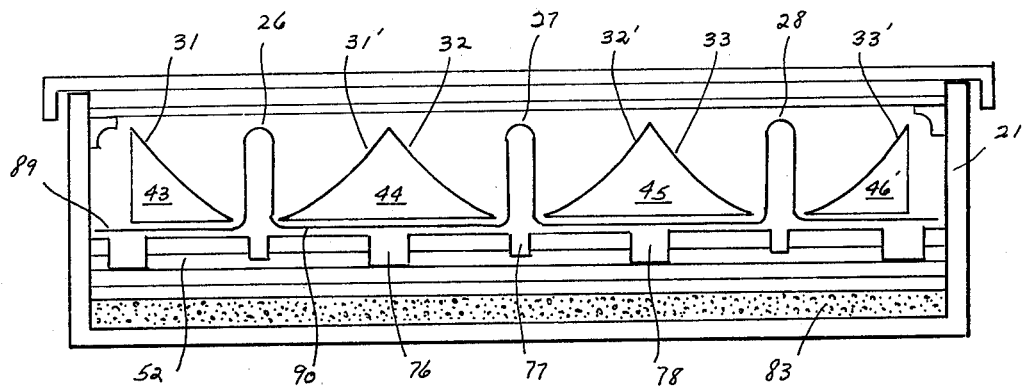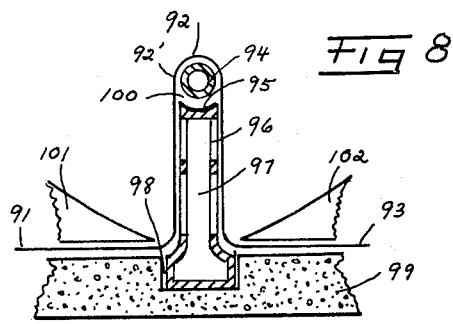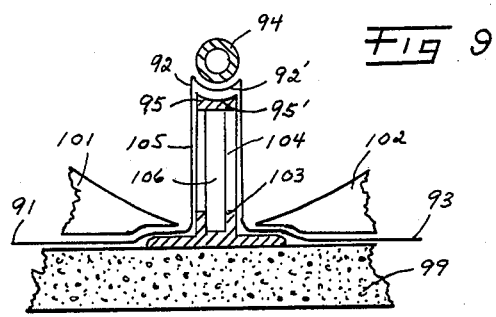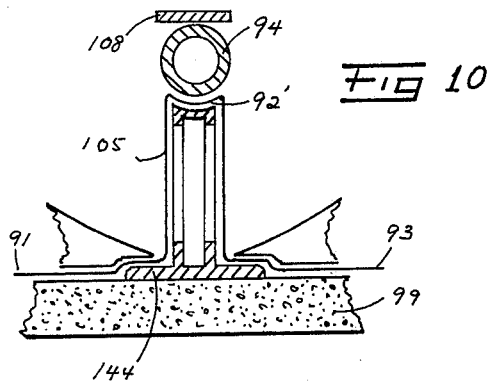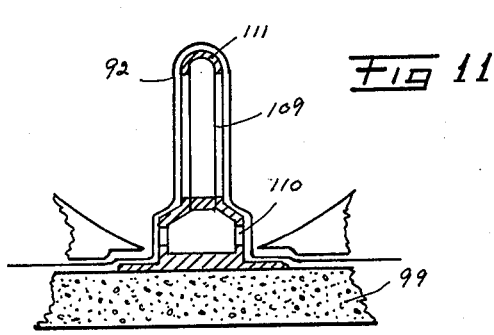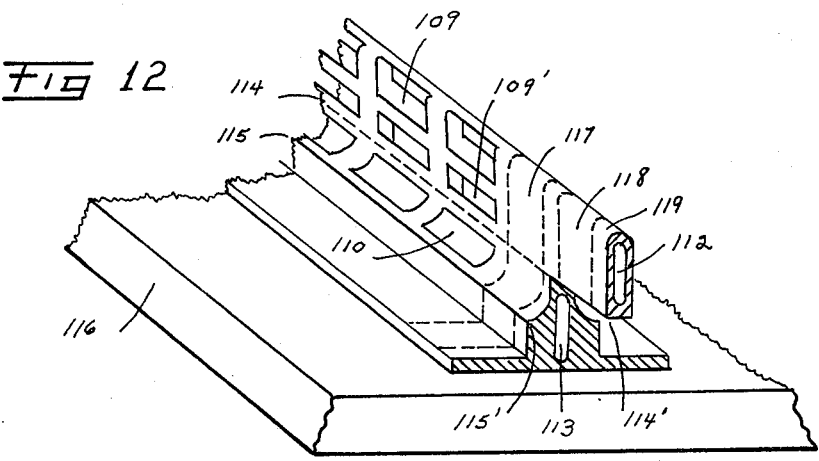

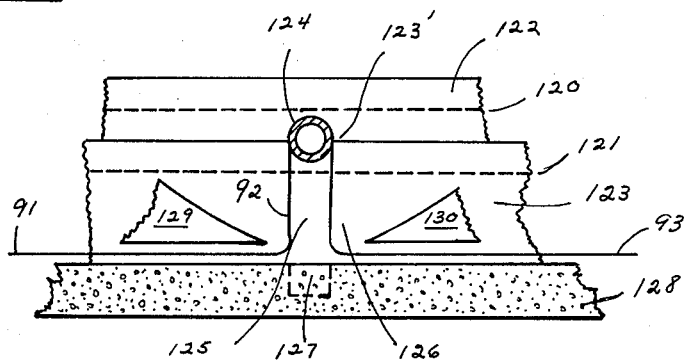
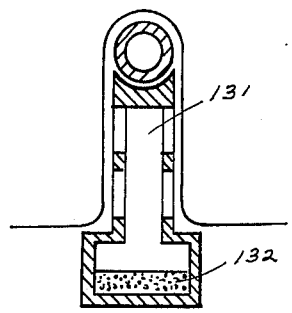
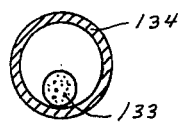
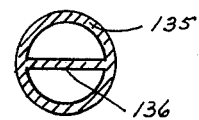
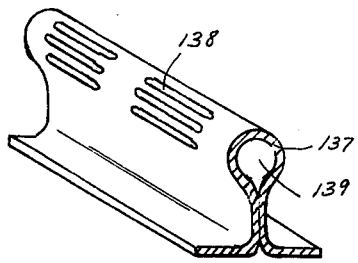
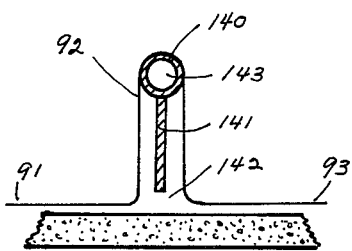

SOLAR ENERGY COLLECTOR

BACKGROUND OF THE INVENTION

In order to reduce the cost of solar energy collectors, my previous applications include teachings that permit low cost materials to be processed at high speeds. For example, U.S. Ser. No. 828,497 describes low cost reflector surface supports, and U.S. Ser. No. 886,217 describes how the reflector surface and the absorber can be made from a common piece of material or a continuous web.

The present invention describes certain unique arrangements whereby further simplification can be achieved by using a single piece of material or a continuous web to form a plurality of consecutive planar absorber means without a requirement to form the material or the continuous web between the absorbers.

In the present invention, reflector surfaces are not joined to the absorber, but are made independently and can be separated therefrom, or can be made separately and assembled in butting relationship to each side of the planar absorber.

In addition to the simplification of manufacturing techniques, the structures of the present invention define a solar energy device which includes an absorber that can transmit usable heat to both liquid and gaseous heat transfer mediums, and is thus a dual-purpose device, being capable, for example, of delivering hot water (or liquid) for domestic hot water use, and at the same time, can deliver heated air. Present commercial practice for hot water and hot air heating modes require the use of two different types of panels.

This invention also includes the use of pre-heating conduits in combination with liquid/gaseous fluid transfer means as contrasted with the devices of U.S. Pat. No. 4,038,464 which describes single stage heating of liquids in a continuous and circuitous heat transfer conduit, or U.S. Pat. No. 3,321,012 which defines a single purpose use in a device having separate and distinct absorber members that cannot be formed from a continuous web or a common piece of material.

Numerous teachings refer to the use of anti-freeze solutions to prevent freezing and expansion of the liquid inside of the heat transfer pipes. In certain of the inventive liquid heat transfer embodiments, this invention describes conduit construction and/or internal members that allow freezing and expansion of internal liquids without damage to the liquid retaining conduits.

OBJECT OF THE INVENTION

The primary object of this invention is to provide a solar energy collector having an absorber with a substantial planar area, and therefore an "extended" vertical working range, and which is made from a single piece of inexpensive material.

Another object of this invention is to provide a solar energy collector panel which can pre-heat gaseous and/or liquid heat transfer fluids concurrently.

Another object of this invention is to provide absorber members which will not be damaged if the liquid contained therein freezes.

Another object of this invention is to provide means for pre-heating of a liquid in a "secondary" heat transfer zone prior to circulating said liquid into a higher temperature heat transfer zone.

Another object is to provide a solar energy collector where the air internal of the collector panel is used as the supply source for inlet air to be subsequently passed through the absorber means.

Another object is to provide a solar energy collector panel which permits the panel to operate in a series or a parallel flow arrangement.

DESCRIPTION OF THE DRAWINGS

FIG. 1 is a plan view of a solar energy collector.

FIG. 2 is a cross section view along line 2—2 of FIG. 1.

FIG. 3 is an enlarged cross-sectional view of a planar absorber similar to FIG. 2, and showing an embodiment suitable for heat transfer to liquids.

FIG. 4 is a cross section along line 4—4 of FIG. 2 showing construction features of the absorber support means in cooperating relationship to the fluid manifolds.

FIG. 7 is a cross sectional view similar to FIG. 2, showing details of a solar energy collector panel according to the embodiment of FIG. 6.

FIG. 8 is an enlarged cross sectional view similar to FIG. 3, showing an absorber having both liquid and air heat transfer means inside of the absorber surface covering.

FIG. 9 is a view similar to FIG. 8 showing a planar absorber with a liquid conduit in external contacting relationship.

FIG. 10 is a view similar to FIG. 9 showing the external liquid conduit in cooperating relationship with an absorber surface which envelopes an internal support which has partially closed conduits.

FIG. 11 is an enlarged cross sectional view of an absorber embodiment wherein two separated conduits are formed from metallic or plastic materials.

FIG. 12 is an enlarged perspective view showing construction features of the absorber of FIG. 11, with an end construction allowing positive closure and leak-proof sealing of same.

FIG. 13 is an enlarged cross sectional view of an absorber having two internal conduits, the lower of said conduits being enclosed by the absorber surface material that partially encloses, and is supported by, the upper conduit.

FIG. 14 shows an absorber similar to FIG. 8, said absorber having an internal member which absorbs expansive pressures when internal liquid freezes.

FIG. 15 shows a circular conduit having a member that is compressible (similar to FIG. 14).

FIG. 16 shows a circular conduit with an internal wall portion that is flexible.

FIG. 17 is a perspective view showing another type of internal absorber support member, said member shown without the overlying absorber surface covering.

FIG. 18 shows an internal liquid conduit having a planar extension attached or increased heat transfer, said conduit and planar extension being shown inside of the absorbing surface covering material.

Figure 5:
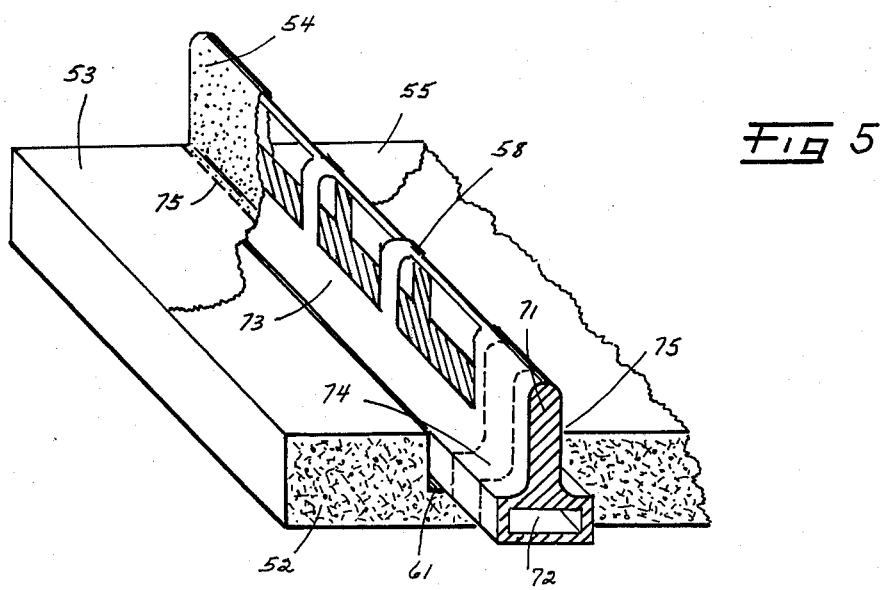
FIG. 5 is a top perspective view showing an absorber support with heat transfer apertures, and a thin metallic absorber surface covering.

With the above and other objects in view, more information and understanding of the present invention may be achieved by reference to the following detailed description.

DETAILED DESCRIPTION

For the purpose of illustrating the invention, there is shown in the accompanying drawings a form thereof which is at present preferred, although it is to be understood that the various instrumentalities of which the invention consists can be variously arranged and organized and that the invention is not limited to the precise arrangements and organizations of the instrumentalities as herein shown and described.

In the drawings, wherein like reference characters indicate like parts:

FIG. 1 illustrates a solar energy collector 20 with the glazing and upper portions of the fluid manifolds removed.

In the embodiment of FIG. 1, a frame 21 contains inlet opening 22, a "U" shaped bottom portion of an inlet manifold consisting of side wall members 23 and 25 which form an intermediate channel or conduit 24. Absorbing means 26 . . . 30 work in cooperating relationship to receive solar rays reflected from reflective surfaces 31–31' through 35–35' absorbing said rays and transferring heat to the inside of fluid conduits 26' . . . 30' . . . etc.

Fluid entering at $F_1$ passes through absorber 26 and is heated by solar rays striking the outer surface of 26, then passes to manifold section 36, and thence through absorber 27 . . . etc. Note that selective placement of channel "blocks" 37 shows the embodiment of FIG. 1 as a "series" flow arrangement. Elimination of said blocks 37 permits the solar energy collector panel to operate in a "parallel" flow arrangement.

Fluid exiting from absorber 30 flows through channel portion 39 and exit pipe 40, emerging as heated fluid $F_2$.

The side view in FIG. 2 shows the glazing means 41 and 42, reflective surface supports 44 . . . 47, and partial supports 43 and 48 for cooperating use with end absorbers 26 and 30. Note that absorbers 26 . . . 30 and intermediate sections which underlie the reflective surface support members are formed from a continuous piece, extending from 49 to 50. In FIG. 2, a fluid channel 51 is formed by the contacting relationship of web portions 49–50 and the insulating sub-base 52 which underlies said portions.

Web material 49–50 which forms the absorbing surface 26 . . . 30 can be thin gauge metallic foil coated for high absorbivity, particularly in absorber regions 26 . . . 30 etc. Thin gauge metallic material forms an impervious air and/or liquid barrier, thus becoming a leakproof enclosure that confines the liquid therein. Because this covering can be thin gauge, heat transmission to internal fluids will be almost instantaneous vis-a-vis thicker walled conduits which impose a time lag before heat applied at the surface penetrates to the interior surfaces.

In FIG. 3, an enlarged side view illustrates that the continuous web 53–55 also forms absorber surfaces 54 and 54', and this beneficial arrangement can be repeated almost indefinitely to form a plurality of absorbers and intermediate flat portions 56 . . . 57 etc., in a continuous manufacturing process.

In FIG. 3, fluid conduit 60 can be adapted for liquids. Conduit 60 is formed by the absorber support (shown generally as at 58), said support including apertures 59 and 59' (see also FIG. 5) which are covered by the absorber surface material 54 . . . 54', thus in effect, portions of the absorber surface material and portions of the absorber support are in cooperating relationship to form the fluid conduit (a).

Groove 61 (similar to channel or groove 51 in FIG. 2) allows surface 62 of absorber support 58 to be flush mounted with the top surface of insulating sub-base 52, with an adhesively bonded interface 62' between the web material and a portion of the absorber support thus forming a leakproof seal.

FIG. 4 shows a solar energy panel with insulator sub-base 52 (shown patterned for clarity) forming manifold channels 24 and 38, said channels or conduits being enclosed by members 66–67 respectively, and sealed with gaskets 64 and 65. Absorber support 68 (see FIG. 5 for details) can be monolithic at its ends except for small conduits, this construction allowing the use of leakproof gaskets (not shown) around sealing area 70 and 70' of the absorber support-absorber ends.

In FIG. 4, the absorber surface is not shown (see FIG. 5) in order to illustrate the apertures $69_a$, $69_b$, . . . $69_d$ . . . , said apertures permitting direct contact of the enclosed fluid with the internal surface of the absorber covering 54. The cooperating relationship between the absorber support 58 and the absorber surface 54 is shown in FIG. 5. Sub-base 52 is grooved (as at 61) to receive the absorber support, said support having a substantially solid end 71 except for fluid conduit opening 72. Solid surfaces 73 and 74 provide a rigid surface for a bonded interface between the absorber surface 54 and the absorber support 58. Lines of perforation 75 can be added to web portions 53 and 55 adjacent the absorber section 54, said perforations reducing the conductive heat loss from the absorber region to other web portions, since heat can only flow via the unperforated (bonds) portions of the web or other material.

Figure 6:
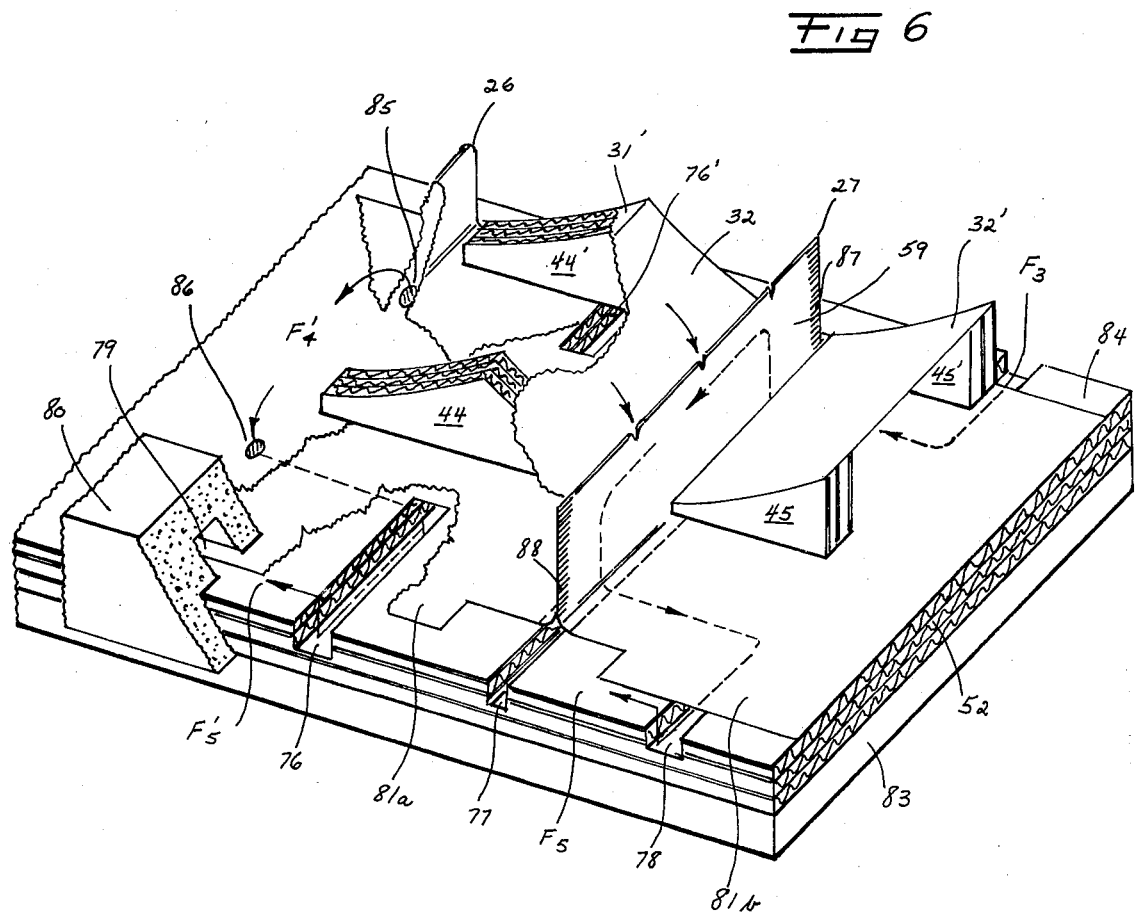
FIG. 6 shows construction details and functional relationships of an embodiment especially well adapted for collection and transfer of heated air.

FIG. 6 shows an embodiment for the heating of air. Various cut-a-way portions are shown in the drawings to describe construction features as they affect the functional aspects and flow characteristics.

In this embodiment, the sub-base 52 is corrugated paperboard that is placed on top of a flat piece of insulator material 83. Sub-base 52 contains grooves 76, 77, and 78, each of which extends partially across the panel (transverse with respect to the longitudinal manifolds). Air $F_3$ enters a groove on one side, flows through corrugated channels which underlie top sheet 84, and enters the air space inside of absorber 27. Flowing toward $F_4$, the air absorbs heat from the absorber surfaces 54 (not shown) and 59, and then flows downwardly into slot 77, and, if proper conditions of negative pressure are induced by external means, the air will also flow through underlying connecting grooves into channel or slot 76 and 78. From underlying slots, the heated air $f_5$ flows into manifold channel 79, and then externally through an outlet opening (not shown). An inverted "U" shaped manifold is advantageously used in this instance.

Reflective surface supports 44, 44', 45 and 45' support the reflective surfaces 32 and 32', and the reflective surfaces direct solar rays to absorber 27 to heat the air inside.

Instead of introducing inlet air from a side manifold (as at $F_3$), heated air inside the collector panel can be used as inlet supply air and can be introduced as at $F_3'$. Instead of coming from source $F_3$, air will be drawn from the void space between the lower glazing member and the reflective surface, as at 145 in FIG. 2.

In another embodiment (see also FIG. 6), inlet supply air is introduced into groove 76', flows through an underlying corrugation, flows upwardly through at least one opening 85, is heated as at $F_4'$, flows downwardly through opening 86, and into one or more underlying slots or grooves on the opposite side of the collector. With additional grooves 76, 78 substantially higher air flow can be achieved with the embodiment of FIG. 6. It is within the scope of this invention to have grooves of variable length, width, and depth, or to use selected additional openings to achieve optimum air flow for the most efficient heat transfer mode.

In the embodiment of FIG. 6, an absorber support similar to 58 of FIG. 5 (but without end openings) can be used, or alternately, absorber surface ends 87 and 88 can be crimp sealed or bonded together to seal the ends.

The elements used in FIG. 6 are shown in FIG. 7. Note that the nadir points of reflector surfaces 31 and 31' are spaced apart in order that the web material intermediate web material 89 and 90 can be formed into an absorber 26.

Although I prefer to make the absorbers and reflectors in a continuous sheet, it is to be understood that the absorbers can be formed separately from the reflector surfaces having parabolic or other reflector shapes, in keeping with high speed manufacture, and thereafter assembled to provide a continuous collector of the reflectors and the consecutive absorbers.

FIGS. 8 through 10 show embodiments wherein the absorber has internal or external members that provide heat transfer to two separate regions, each region being defined as a separate fluid conduit.

In FIG. 8, a continuous piece of metallic material 91 to 93 is shaped to form the outside "skin" of absorber 92. Enclosed by the absorber surface 92', conduit 94 heats fluid contained therein by absorbing heat transferred to fluid in space 100 via apertures 95' (not shown) in absorber support 95 which also has apertures 96 that allow the inside surface of the absorber covering 92' to transfer heat to fluid contained in conduit 97. Recess 98 in the insulator sub-base 99 allows "flush" mounting of the absorber.

In FIG. 8, a space 100 between conduit 94 and the top surface of the absorber support 95 indicates that the absorber covering 92' is spaced from conduit 94, in which event, conduit 94 can be supported by members adjacent each end (as at 123' of FIG. 13). Alternately, it is understood that conduit 94 could be arranged to be directly supported by absorber support 95. Reflector surfaces 101 and 102 are shown in cooperating relationship to the two-conduit absorber means.

FIG. 9 shows a gap between absorber 94 and the support below, however, this is for illustration purposes only—that is, portion 92' of conductive absorber covering 92 is engaged by the bottom portion of conduit 94 and surface 95' of the support below, said engagement to be a conductively contacting relationship. Heat will be transferred to fluid inside conduit 94 by focusing solar rays thereupon, as well as by conduction from external surfaces 105 (etc.) of the planar absorber side covering. Heat is also transferred to fluid 106 from absorber surfaces 105 through apertures 104. It is noted that the top portion 95 can also contain one or more openings (not shown) so that the heated fluid 106 contained in the lower conduit will be in contact with the uppermost portion of the absorber covering (as at 92') and thereby conduct additional heat from fluid 106 to fluid contained in conduit 94.

FIG. 10 is an embodiment like FIG. 9 except that conduit 94 is wider than the vertical planar absorber (shown generally as 107), thereby providing a larger target for focused rays of highly concentrated solar energy—this arrangement being beneficial when, for example, the fluid inside conduit 94 is used with absorption type air conditioning. A member 108 installed above conduit 94 can minimize rereflection of rays from the surface of pipe 94, and by exerting downward pressure can keep conduit 94 in full transverse contact with the top portion 92' of absorber material 105.

FIG. 11 shows a two-conduit absorber whereby the fluid inside of each conduit contacts the inside surface of absorber covering 92 through apertures 109 and 110. This embodiment describes a two-conduit absorber which can consist of an absorber support 111 (see also FIG. 12) made of non-conductive plastic materials, hence, the only metallic component in the absorber is covering 92.

FIG. 12 illustrates an absorber support made of non conductive plastic material and shows a two-conduit absorber with the absorber metallic covering removed. This figure illustrates how end connections can be made and shows how the absorber covering can be adhesively sealed and/or gasketed to provide leakproof conduit closures.

The end portions of the absorber support can be substantially monolithic except for openings 112 and 113. The absorber support can be mounted on top of sub-base 116 as shown, or can be arranged similar to FIG. 8.

Apertures 109 and 109' will allow fluid inside the top portion (112) to contact and be enclosed by the outer absorber covering (not shown—see 54 of FIG. 5). The absorber covering is bonded to the curvilinear surface between 114-114' and 115-115', thereby being transversely sealed in a leakproof manner. Edge portions of the absorber covering will also be adhesively bonded to the curved and flat surfaces of the absorber support in regions shown as 116, thereby completing enclosure of the top fluid conduit—these bonded or gasketed seals being made on both planar sides of the absorber. Fluids being thusly contained, the fluid 113 in lower conduits can enter the lower fluid manifold (not shown), with gasket type seals also being placed in zone 117. The extended portion 118-119 of the upper fluid conduit can be confined between upper and lower portions of a second fluid manifold (not shown), and together with gaskets or seals, will thereby describe a leakproof system.

In FIG. 13, a manifold channel is formed between dotted lines 120 and 121 when the inverted "U" shaped upper member 122 is brought into contacting relationship with "U" shaped member 123. Conduit 124 is supported in a semi-circular recess in the lower piece 123, and held in gasketed leakproof relationship when locked in place by the inverted semi-circular recess of upper portion 122.

Web portion 91-92-93 is then supported from conduit 124 and is bonded to sub-base 128, thereby affecting a full enclosure for the second conduit 125. Although a space 126 is shown for reason of clarity, eliminating this gap and moving the reflective surface supports 129 and 130 into butting relationship with vertical planar side portions of material 92 can also restrict and securely hold the side absorber covering in place.

Groove 127 (shown dotted) can be used when a solid end plug is employed to effect end closure of the bottom absorber.

In FIG. 14, a two-conduit absorber similar to FIG. 8 is shown. Inside lower conduit 131 is a longitudinal piece of expanded rubber or plastic material 132 which can withstand pressures of up to about 40 psig without being fully compressed. If the liquid in conduit 131 should freeze, the cellular material will be subject to additional forces resulting from the expansion of water as it freezes, but will absorb these forces by permitting additional compression, with a resultant decrease in the volume of material 132, or conversely, an increase in the volume of conduit 131. The upper conduit in FIG. 14 can be arranged according to FIG. 15 or 16.

FIG. 15 shows a cellular member 133 placed inside conduit 134 to function as described above. It is understood that an elongated cylindrical section of plastic with sealed ends to become airtight could alternately be used as a compressible member.

In FIG. 16, circular conduit 135 can have a thin dividing wall section 136, said section being subject to additional deformation so as to increase the volume of the fluid conduit as water freezes.

FIG. 17 illustrates a single conduit absorber support member 137 which is shown without the absorber covering, but includes openings 138 which allow transfer of heat to the fluid inside opening 139.

In FIG. 18, a metallic upper conduit 140 includes a vertical planar fin-like extension 141 being contained within a second conduit 142 which is formed by portion 92 of material 91-93. The planar extension is metallic and conductively transfers heat from conduit 142 to conduit 140 and to the fluid 143 inside of said conduit.

In certain embodiments, particularly FIGS. 9 and 10, the upper circular conduit can be non-metallic and could then be opaque and/or absorptively coated.

Circular conduits inside the absorber covering according to FIGS. 8 and 14 can also be non-metallic, albeit lower heat absorption characteristics.

In FIG. 18, the circular conduit and fin-like extension should be metallic for proper conductive functioning.

In the abovementioned embodiments that permit freezing of water without damage to the conduits, significant cost savings occur by eliminating anti-freeze solutions, but more importantly, this unique approach eliminates the requirement for an anti-freeze/water heat exchanger in the total system.

Although two-conduit systems are described for two-stage heating, or concurrent heating of two different fluids, additional conduits can be provided to heat more than two fluids, or to pre-heat any selected fluid or plurality of fluids.

The solar energy collector device described herein can be substantially increased in size to be used for collection of solar rays as a system that is built to suit the application or as an integral part of a building roof system. For example, in FIG. 2, elements 43 and/or 44 could be trusslike members with an upper portion thereof being contoured and mounted above, or, trusslike members can be arranged in vertically juxtaposed relationship to impart column strength to a shaped member that supports the reflector surface 31, or 31' and 32 etc.

Likewise, the absorber support (if needed) and the absorber surface covering can be arranged as defined in the various embodiments included herein.

The horizontal extension $81_a$ and $81_b$ of the absorber surface can be continuous with the absorber similar to the embodiment of FIG. 6 and thereby define collectors that can discharge heated fluid from the sides or bottom of the absorber. In certain building designs, the horizontal piece can become the bottom wall of the enclosed fluid conduit (similar to portion 144 of FIG. 10) with limited extensions of the horizontal member being furnished only as necessary to insure a leakproof enclosure for fluid contained therein.

In large collector applications, the use of several pieces of material in butting or overlapping relationship to create a "substantially" continuous piece of material is considered to be a functional equivalent of the single piece or a continuous web.

It is understood that the present invention may be embodied in other specific forms without departing from the spirit or special attributes hereof, and it is therefore desired that the present embodiments be considered in all respects as illustrative, and therefore not restrictive, reference being made to the appended claims rather than to the foregoing description to indicate the scope of the invention.

Having thus described my invention, what I claim as new and desire to protect by Letters Patent are the following:

1. A solar energy concentrating collector having at least one reflector surface and at least one substantially planar vertical absorber surface coacting therewith for the purpose of absorbing reflected solar rays, said absorber surface being at least partially located in a plane coincident with the nadir of the reflector surface at least one fluid conduit underlying said collector absorber surface the absorber surface being continuous and forming a portion of said fluid conduit, at least one horizontal extension of said continuous absorber surface being below said coacting reflector surface, a continuous web of thin material forming said absorber surface and said horizontal extension, spaced apart first portions of said continuous web of thin material, an absorptive coating on said spaced first portions, said spaced first portions being formed to define a partial enclosure of one of said fluid conduits a second portion of the said continuous web of thin material adjacent the absorptively coated portion being below said coacting reflector surface, fluid input and output means, said fluid conduit being cooperatively connected to said fluid input and output means.

2. The solar energy collecting device of claim 1 wherein a portion of the substantially vertical absorber surface is in cooperating heat transfer contact with a second fluid conduit, said second fluid conduit being arranged in parallel relationship and mounted above the absorber surface.

3. The solar energy collecting device of claim 1 wherein a portion of the internal surface of the substantially vertical absorber surface is in cooperating heat transfer contact with the fluid conduit, said fluid conduit being metallic and arranged in parallel relationship with said absorber surface.

4. The solar energy collecting device of claim 1 wherein a web supporting means underlies the planar absorber surface, said web support means providing at least one fluid conduit.

5. The solar energy collecting device of claim 4 wherein at least one of said conduits contains a liquid heat transfer medium.

6. The solar energy collecting device of claim 1 wherein a second fluid conduit is located above the substantially vertical planar absorber surface and in parallel relationship thereto, said conduit consisting of a heat absorbing plastic fluid conduit.

7. The solar energy collecting device of claim 1 wherein the continuous web is constructed of plastic material.

8. The solar energy collecting device of claim 1 wherein the space between said spaced apart first portions further define a first conduit containing a first heat transfer medium, said space also containing at least one tubular metallic second fluid conduit, said first medium transferring heat to the second fluid conduit which is also in fluid communication with said first conduit.

9. The device of claim 4 wherein said web supporting means has at least one aperture to facilitate heat transfer from said fluid conduit through an upper portion of the absorptive web to a metallic second fluid conduit mounted in external contacting relationship with the absorber surface.

10. The solar energy collecting device of claim 1 having a sub-base and wherein at least a portion of the absorber surface material is in contacting relationship with the sub-base, said sub-base having at least one transverse groove parallel with the longitudinal axis of the absorber.

11. The device of claim 10 wherein said transverse groove underlies the top surface of the sub-base, said top surface having apertures therein to connect said fluid input and output means to said underlying grooves.

12. The device of claim 11 wherein the sub-base includes underlying longitudinal passages interconnecting a plurality of said transverse grooves said transverse grooves extending partially across the sub-base.

13. The solar energy collecting device of claim 1 wherein said absorber surface has at least one aperture, said aperture permitting flow of air from above the reflector surface into the fluid conduit enclosed by said absorber surface.

14. The device of claim 10 wherein said transverse grooves are in cooperating relationship with a bottom opening in the fluid conduit.

15. The solar energy collecting device of claim 1 having an absorber support, the absorber surface being in overlaying external contacting relationship to the absorber support, said support having solid end closures above the nadir of the absorber.

16. The solar energy collector device of claim 1 wherein said first and second web portions are discreet pieces and are joined together to form a leakproof seal.

17. The solar energy collector device of claim 16 wherein the discreet web segments are of different materials.

18. The solar energy collecting device of claim 1 wherein the bottom portion of the fluid conduit has at least one aperture therein to permit the transfer of heat to the underside of said bottom portion.

* * * * *